United States Patent [19]
Bingel et al.

[11] Patent Number: 6,014,425
[45] Date of Patent: Jan. 11, 2000

[54] APPARATUS AND METHOD FOR QUALIFYING TELEPHONES AND OTHER ATTACHED EQUIPMENT FOR OPTIMUM DSL OPERATION

[75] Inventors: Thomas J. Bingel, Bellear Beach; John Parish, Clearwater, both of Fla.

[73] Assignee: Paradyne Corporation, Largo, Fla.

[21] Appl. No.: 08/938,456

[22] Filed: Sep. 29, 1997

Related U.S. Application Data

[60] Provisional application No. 60/039,094, Feb. 26, 1997.

[51] Int. Cl.⁷ .............................. H04M 1/24; H04M 3/08; H04M 3/22
[52] U.S. Cl. .................................. 379/27; 379/2; 379/28; 379/32; 375/225; 375/228
[58] Field of Search .................................. 379/26, 27, 28, 379/29, 1–2, 32, 34; 375/222, 224, 225, 228

[56] References Cited

U.S. PATENT DOCUMENTS

| | | | |
|---|---|---|---|
| 5,050,205 | 9/1991 | Kelly et al. | 379/28 |
| 5,392,334 | 2/1995 | O'Mahony | 379/93.09 |
| 5,553,059 | 9/1996 | Emerson et al. | 379/28 |
| 5,559,792 | 9/1996 | Bottoms et al. | 375/222 |
| 5,617,466 | 4/1997 | Walance | 379/28 |
| 5,648,989 | 7/1997 | Ko | 375/222 |
| 5,757,680 | 5/1998 | Boston et al. | 379/21 |
| 5,805,669 | 9/1998 | Bingel et al. | 379/28 |

*Primary Examiner*—Curtis A. Kuntz
*Assistant Examiner*—Binh K. Tieu
*Attorney, Agent, or Firm*—Thomas, Kayden, Horstemeyer & Risley

[57] ABSTRACT

Apparatus and method are provided for qualifying POTS devices for optimum operation that involve measurements and analysis of the POTS device's impedance over the modem spectrum, noise emanations, and non-linear distortion. The apparatus includes a test port that analyzes the POTS device measurements that could impact the data communication device performance over the POTS line into the user premises. Testing for line monitoring of the entire premises while the data communication device is in an operating state is also possible. Operating state testing measures the minimum and maximum data rate achievable by the data communication device while each POTS device is in an on-hook or off-hook state. The data communications device is configured to provide notice if a less than desirable data rate occurs. This notice indicates that there is a device connected within the user premises that is limiting the overall data rate and that testing of each individual POTS device is needed.

30 Claims, 9 Drawing Sheets

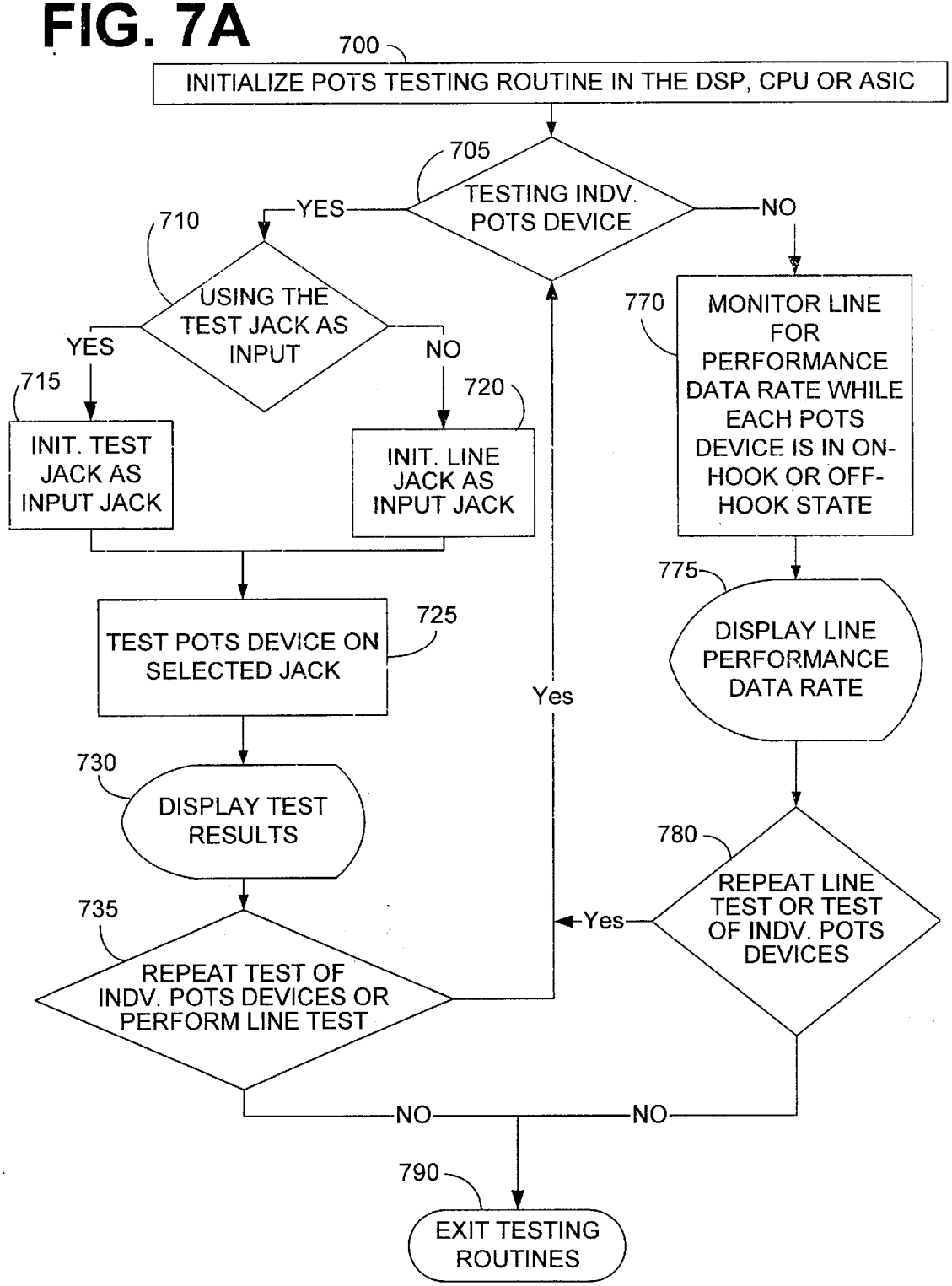

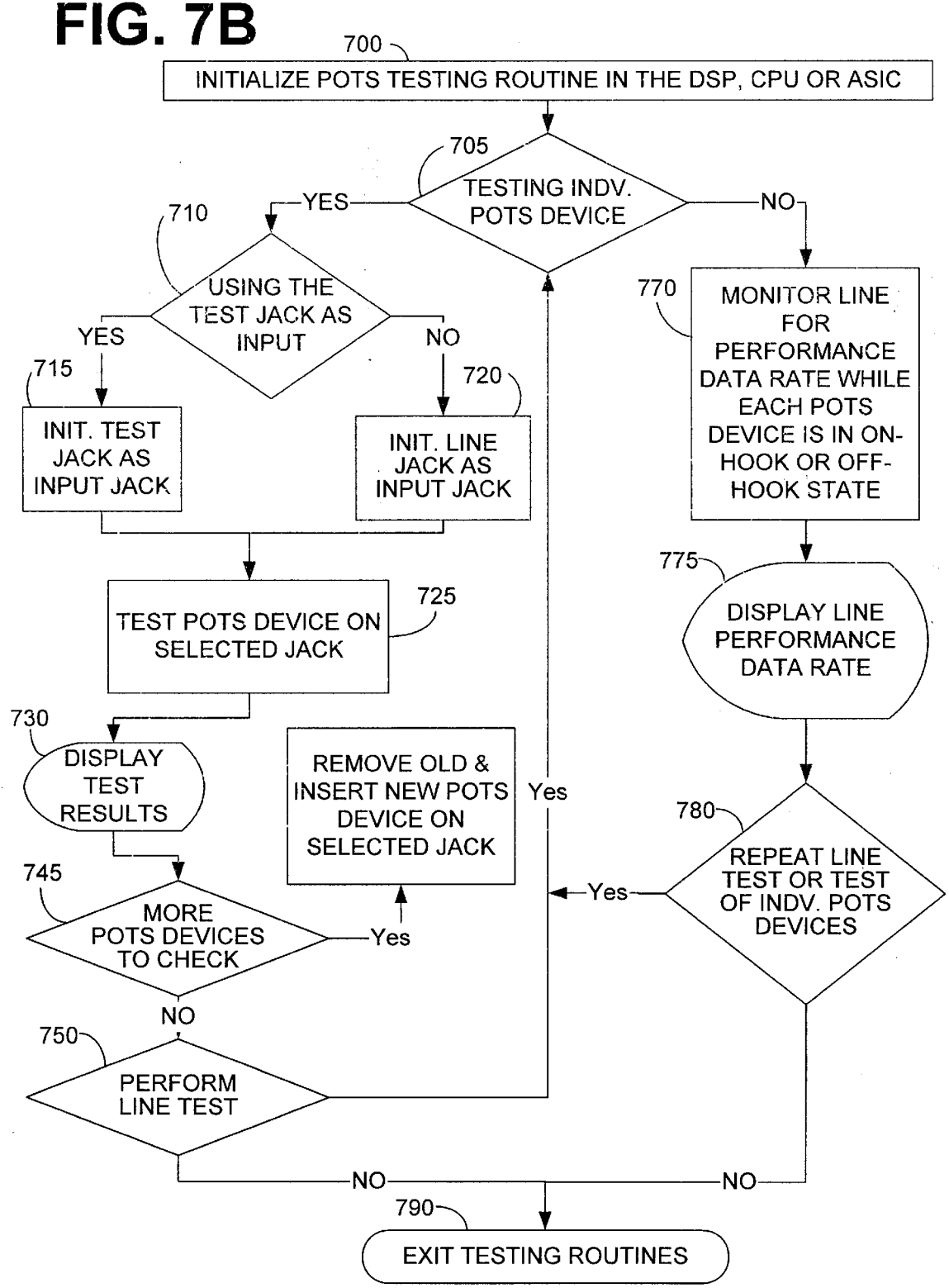

APPARATUS AND METHOD FOR QUALIFYING TELEPHONES AND OTHER ATTACHED EQUIPMENT FOR OPTIMUM DSL OPERATION

CROSS-REFERENCE TO RELATED APPLICATIONS

This application claims the benefit of U.S. Provisional Patent Application Serial No. 60/039,094, filed on Feb. 26, 1997, and entitled METHOD FOR QUALIFYING TELEPHONES AND OTHER ATTACHED EQUIPMENT FOR DSL WITHOUT POT FILTER/SPLITTERS.

FIELD OF THE INVENTION

The present invention generally relates to an apparatus and method for testing and monitoring data communications equipment that may impact the operation of a multiple channel data communications device residing on the same connections as the equipment, and more particularly, an apparatus and method to allow a user to identify data communications equipment that limits the achievable data rate of a multiple channel data communications device residing on the same connections as the equipment.

BACKGROUND OF THE INVENTION

As known in the art, practically all modems can be put into a local or remote loopback mode. In local loopback mode, signals are generated and transmitted to the local modem to test both the analog and digital circuits of that modem. These signals are then retransmitted back to the generating source for analysis to determine the quality and error rate of the data signal within the modem. In the remote loopback test, a device generates and transmits a signal to the local modem. The local modem demodulates the signals, then transmits it to the remote modem. If the remote modem is placed into the loopback mode, then the signal is passed through the analog circuitry and retransmitted back on the line to the local modem, which passes the signal on to the generating device. At that time, the generating device can then analyze the loopback signals for their quality and error rate.

The problem with loopback testing is that only the modems and the communication lines through which the data signals are sent are tested. Loopback testing does not test the local devices (e.g. telephone, fax machine or PC) attached to the modem. Nor does loopback testing test any devices connected to the user premises communication lines. Instead, for testing local plain old telephone system (POTS) devices, special diagnostic equipment is needed. This special diagnostic equipment operates to test a POTS device impedance over the modem spectrum (frequency bandwidth utilized), noise emanations, and distortions. Types of noise emanations that can be detected are background noise, impulse noise, noise with a tone, impedance, and non-linear distortion.

Noise with tone is an active noise that can be generated by elements in the communication circuits, such as comparators and quantizers. Many of these elements are active only when a tone is being transmitted. To test noise contributed by these elements, a tone must be generated and transmitted to measure the resultant signal. A notch filter may then be used to remove the test tone to allow analysis of the noise generated on the line.

Background noise is a form of constant signal on the communications line or in a communication circuit due to the random movement of electrons. In general, the power of background noise is proportional to the temperature.

Impulse noise can be a major cause of errors in any device or communication link. Impulse noise can be created by many different sources such as weather changes, dialing noise, dirty electrical contacts, and movement of poorly connected electronic devices.

Distortions come in numerous forms classified generally as either linear or non-linear distortion.

Linear gain and phase distortion are frequency dependent responses, which are not a function of signal amplitude, or phase and time invariant.

Another type of distortion is non-linear gain and phase distortion. Gain or phase delay are not constant, but vary non-linearly as a function of signal amplitude, and may include a frequency dependence.

Yet another observed form of non-linear distortion is intermodulation distortion. Intermodulation distortion involves the generation of new signal components that are not present in the original transmitted signal. Main causes of intermodulation distortion are electronic devices such as modulators, demodulators and overdriven amplifiers.

Another parameter tested in a device is the return loss or the impedance match of a circuit. Mismatch occurs in a device when its input impedance does not match a standard impedance or transmission line characteristic impedance.

Heretofore, modems have lacked the ability to test a device's impact on a user premises POTS system. Accordingly, there is a need to develop a system having the ability to identify whether a device connected to the POTS system within the user's premises may be limiting the achievable data rate of the modem. With such a system, any device identified as limiting the maximum achievable data rate of a multiple channel data communications device, could be disconnected from the premises wiring or connected to the premises wiring through a simple filter or isolating device to improve the modem operation.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a modem apparatus and method for qualifying telephones and other devices for optimum operation in user premises POTS wiring.

One embodiment of the modem apparatus and method for qualifying devices for optimum operation includes apparatus for measurement and analysis of a device's impedance over the modem spectrum (frequency bandwidth utilized), noise emanations and non-linear distortion caused within the user's premises POTS lines. The modem used in this embodiment includes a memory, containing a plurality of POTS device testing sequences, and a processor that selects from the memory one of the POTS device testing sequences and performs the selected POTS device testing sequence on a POTS device connected to a port in the modem. The processor analyzes the above noted measurements of the POTS device to determine if the POTS device being tested could impact the optimum modem performance over the POTS line into the user premises.

An alternate embodiment allows for line monitoring of the entire user's premises while the modem apparatus is in an operating state. The alternate embodiment measures the minimum and maximum data rate achievable by the modem apparatus while each POTS device, connected to the user premises POTS system, is in either an on-hook or off-hook state. The modem apparatus notifies the user if a less than desirable (predetermined) data rate occurs. This warning notifies the user that there is a device connected within the user premises that is limiting the overall data rate and that each individual POTS device needs to checked.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 7 is a flow chart of the process for testing POTS devices.

Figure 1:
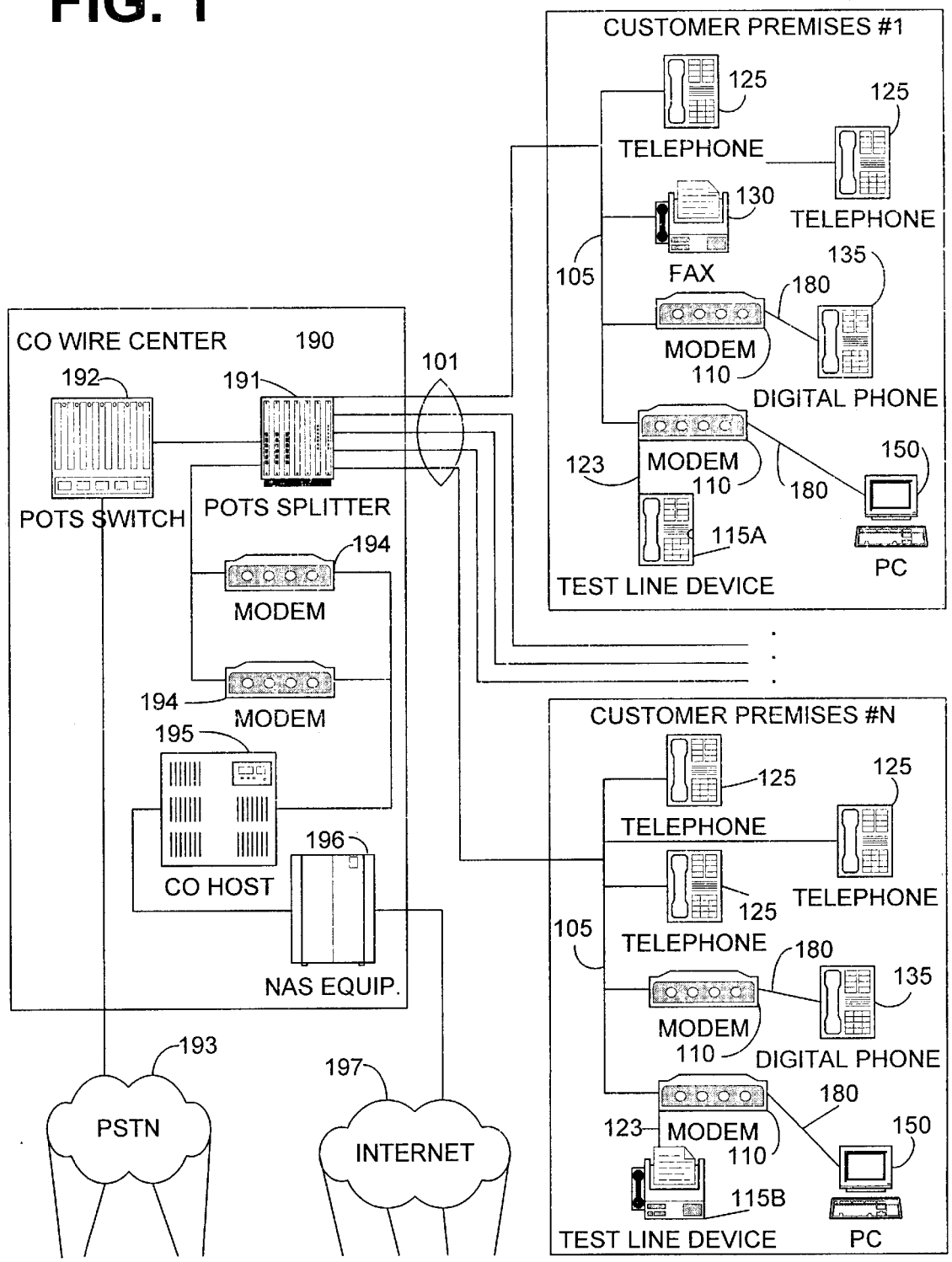
FIG. 1 is a view of the POTS network layout of the present invention, including the apparatus for testing POTS devices.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Referring now in detail to the drawings in which the reference numerals indicate like parts throughout several views.

FIG. 1 illustrates the plain old telephone system (POTS) networks including modem 110 of the preferred embodiment, that includes the apparatus and methods for qualifying POTS devices on a test line 123.

The POTS network includes numerous user premisess, wherein each user premises is connected to a central office wire center 190 via a subscriber line 101. Each subscriber line 101 is connected to the user premises and connects to the user premises line 105 that distributes the POTS service throughout the user premises. Usually, there are numerous POTS devices connected to each user premises line 105 such as telephones, fax machines, PC modems, and the like. It is also known, (but not shown), that it is possible to have multiple subscriber lines 101 connected to each user premises, thereby creating two separate user premises lines 105 within each user premises.

As noted previously, each user premises is connected via a subscriber line 101 to a central office wire center 190. The subscriber line 101 is connected to a POTS splitter device 191 that separates the POTS signals from digital signals. The plain old telephone system (POTS) signals are sent on to a POTS switch 192 that is connected to the other central office wire centers via the PSTN 193. Digital signals separated from the POTS analog signals at POTS splitter 191, are connected to modems 194 within the central office wire center 190. Modems 194 are further connected to a central office host 195 for processing and transmission of data signals to network equipment 196, for connection with digital data networks such as the Internet 197.

Since the above is a description of the present invention's applied system, a brief discussion of an example of the signals generated in the user premises and transmitted through the central office wire center, via either the PSTN or Internet networks back a user premises will now be detailed.

When a user wishes to place a telephone call on device 125, the user picks up the receiver and puts the subscriber line 101 in an off-hook condition that is detected at the central office wire center 190. The off-hook condition signals the central office wire center 190 via subscriber line 101 to accept an outgoing call by allowing a flow of D.C. current and a dial tone of 480 Hz to be sent to device 125. The outgoing telephone call signals are transmitted, as described before, via subscriber line 101 to POTS splitter 191. The POTS system signals are then separated from digital signals, and the POTS signals are directed towards the POTS switch 192 for transmission via the PSTN network 193 to the destination central office wire center of the destination user premises. The signal from a source central office wire system transmitted through the PSTN network 193 is directed towards the POTS switch 192 in the destination central office wire center. The signal is further directed towards a POTS splitter 191 within the destination central office wire center 190. The signal is transmitted via subscriber line 101 to the destination user premises. The signal enters the destination user premises, via subscriber line 101, and is connected to the user premises line 105 that distributes the signal to be received throughout the destination user premises. That is the path in which a plain old telephone system (POTS) call is transmitted.

Now, a description of digital signals to/from the user premises will be described. When a user desires to transmit data over a network via a personal PC, digital phone, digital fax, or the like, the digital signals from the digital device, are transformed into analog signals via modulation by modem 110. The signals are transmitted over the user premises line 105 to the subscriber line 101 for final delivery to the local central office wire center 190. The modulated signals go into POTS splitter 191 and are separated from the POTS signals by frequency division and are directed to modems 194. The digital data modulated signals occupy a higher frequency band than POTS. The POTS splitter uses frequency selective filters to separate POTS from digital data modulated signals. Modems 194 convert the modulated signals back to their original digital signals. The modems 194 transmit the digital signals to the central office host 195 for processing and transmission of the data signals to network equipment 196 for further transmission of the data signals over the Internet 197. Conversely, the digital signals sent via the Internet 197 are received at the destination central office wire center 190, by the network access service equipment 196. The signals are transmitted to the central office host 195, for processing and transmission to the modems 194. The modems 194 modulate the digital signals into analog signals for transmission through the POTS splitter 191 and over destination subscriber line 101 to the destination user premises. The modulated signals are received at the user premises line 105, for distribution to all equipment connected to the user premises distribution line. The modulated signals are demodulated, within the destination modem 110, back to a digital signals, which are transmitted to the digital device connected to the modem.

With the vast amount of digital data transmitted within the above described operating environment, it is critical to identify and eliminate devices that prevent modems 110, connected to the user premises distribution line 105, from achieving optimal performance. The first embodiment of the modem apparatus and method for qualifying devices for optimum operation allows for the identification and possible elimination of devices that prevent digital devices from achieving the desired optimal performance. The modem apparatus and method include apparatus for the measurement and analysis of a device's impedance over the modem spectrum (frequency bandwidth utilized), noise emanations and non-linear distortion attached to the user's premises POTS lines.

The modem used in this embodiment includes a memory containing a plurality of POTS device testing sequences, and a processor that selects from the memory one of the POTS device testing sequences and performs the selected POTS device testing sequence on a POTS device connected to a port on the modem. The processor analyzes the above-noted measurements of the POTS device to determine if the POTS device being tested could impact the optimum modem performance over the POTS line into the user premises. The test results are displayed to the user in a number of ways as GOOD, FAIR, or POOR light indicators on the modem, or displayed on the digital device connected to the modem.

An alternate embodiment allows for line monitoring of the entire user's premises while the modem is in an operating state. The alternate embodiment measures the minimum and maximum data rate achievable by the modem while each POTS device, connected to the user premises POTS system, is in an on-hook or off-hook state. The modem notifies the user if a less than desirable (predetermined) data rate occurs. This warning notifies the user that there is a device connected to the user premises line that is limiting the overall data rate and that each individual POTS device needs to checked. The components of the present invention are described in reference to FIGS. 2–8.

Figure 2:
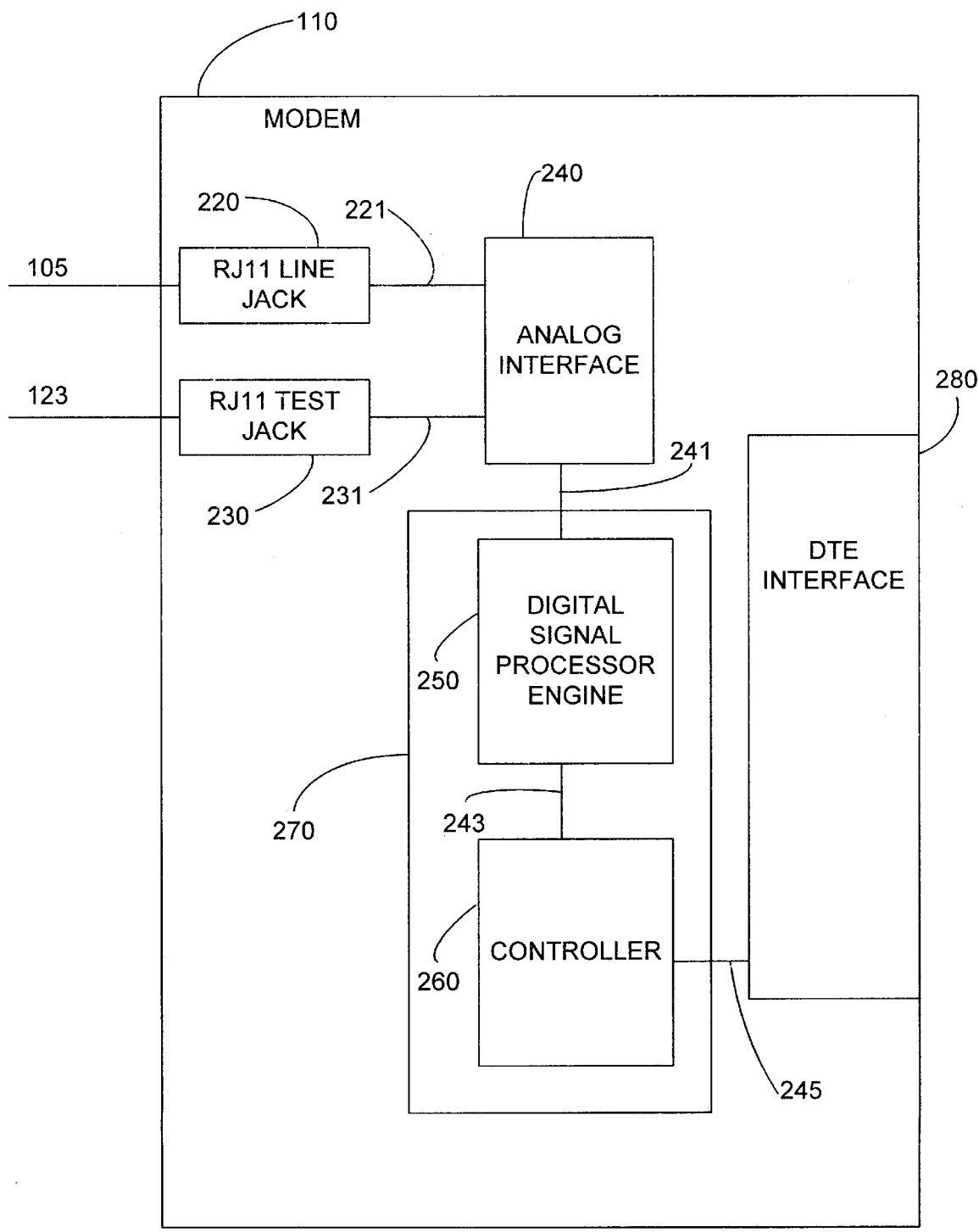
FIG. 2 is a block diagram of the apparatus for testing POTS devices of FIG. 1.

FIG. 2 is a block diagram of the multichannel data communication device (modem 110) constructed in accordance with the present invention. The typical configuration of user premises line 105 is connected to an RJ11 line jack 220. Test line 123 is connected to an RJ11 test jack 230. Both RJ11 line jack 220 and RJ11 test jack 230 are connected to an analog interface 240. RJ11 line jack 220 is connected to the analog interface 240 via a communication link 221. RJ11 test jack 230 is connected to the analog interface 240 via a communication link 231. Analog interface 240 will be explained in detail hereinafter with reference to FIG. 3. Generally, the analog interface contains line protection and impedance components, isolation components, drivers and receivers, and analog-to-digital (A/D) and digital-to-analog (D/A) converters. Communication links 221 and 231 provide analog POTS signals into the analog interface 240. The output of the analog interface on communication link 241, includes a digital signal that is input into the combined digital signal processor engine controller 270.

In the first embodiment, the combined digital signal processor engine controller 270 is comprised of a digital signal processor engine 250 and controller 260. The digital signal processor engine 250 is connected to controller 260 via a suitable communication link 243. The combined digital signal processor engine controller 270 is connected to the local device via line 245 through the data terminal equipment (DTE) interface 280, which connects to a device such as a facsimile, digital phone, personal computer (PC), or the like.

Figure 3:
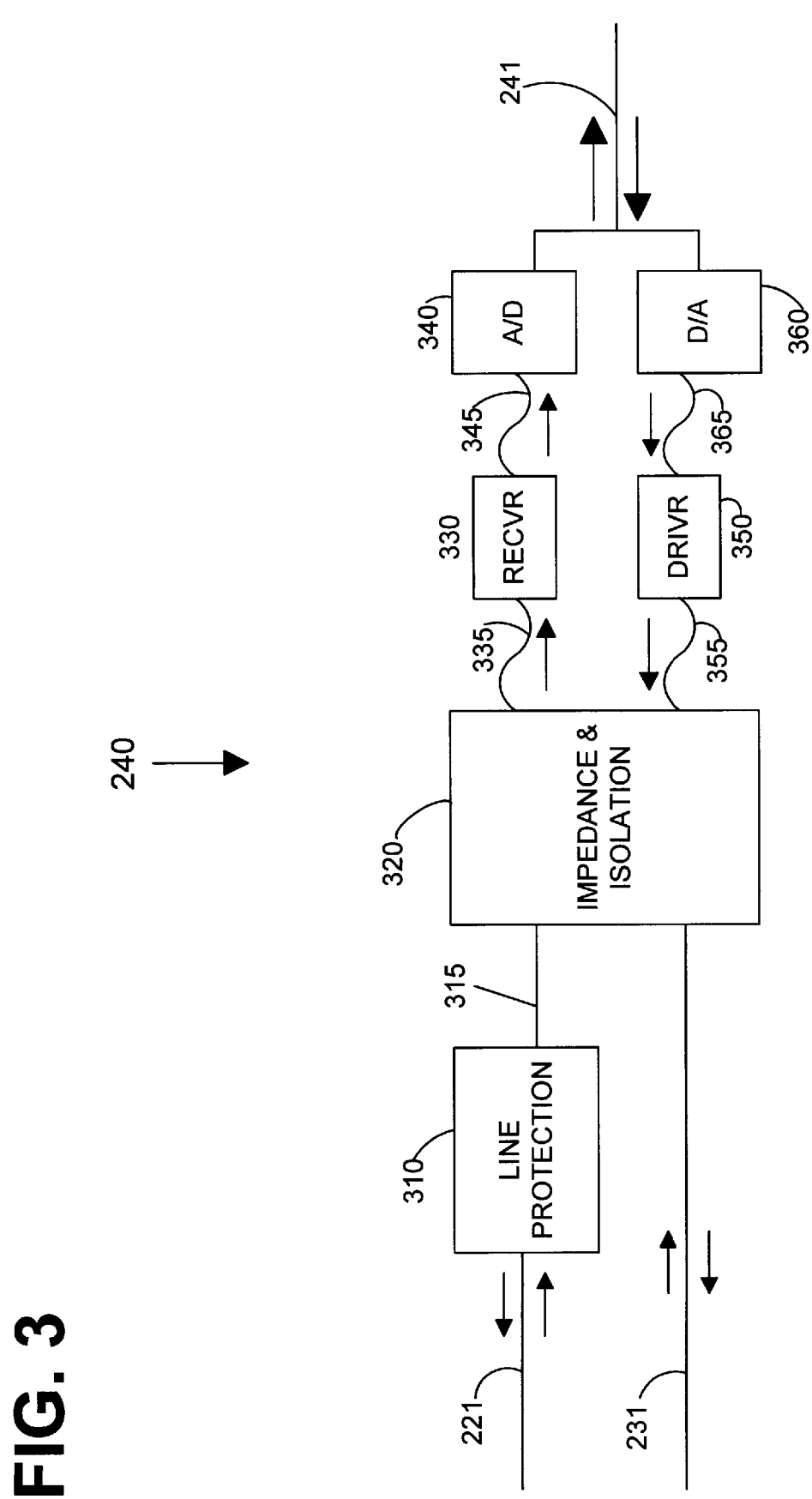
FIG. 3 is a block diagram of the analog interface of FIG. 2.

Referring to FIG. 3, which is a block diagram of the analog interface 240, the analog interface 240 has two input/output analog communication ports for directional communications links 221 and 231. Analog communication link 221, connected to the user's premises, is connected to a line protection device 310. Line protection device 310 protects the multichannel communications device against line surges, lightning strikes, and the like. Line protection circuit 310 is then further connected to the impedance and isolation circuit 320 via communication link 315. The impedance and isolation circuit 320 also connects directly to the test device line 231. The test device communication link 231 being directly connected to the RJ11 test jack 230 (FIG. 2).

The impedance and isolation circuit 320 is comprised of a two-wire to four-wire hybrid circuit interface (not shown) for both communication link 315 and test communication link 231 (FIG. 2). Communication link 315 is first connected to an impedance matching circuit (not shown) before being connected to the two-to-four wire hyped interface (not shown). Both communication link 315 and test communication link 231, send signals on communication link 335, and receive signals from communication link 355. Communication link 335 is connected to receiver 330 which receives the analog signals and transmits them to the analog-to-digital converter 340 over communication link 345. Driver 350 drives the signals through the impedance and isolation circuit 320 across communication link 355 after receiving signals from the digital-to-analog converter 360 over communication 365. Analog-to-digital converter 340 and digital-to-analog converter 360 are both connected to the bi-directional digital communication link 241.

Figure 4:
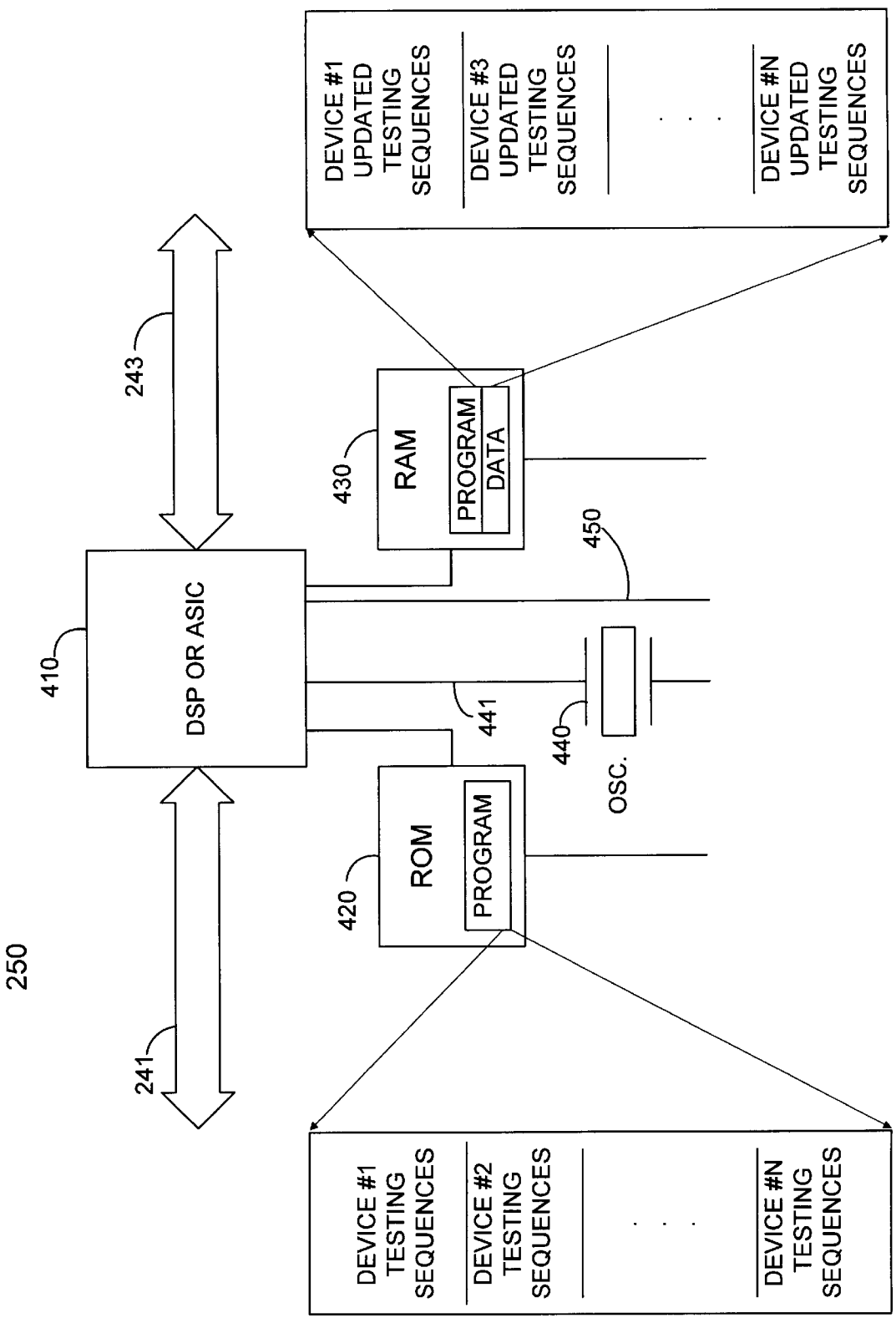
FIG. 4 is a block diagram of the digital signal processor engine of FIG. 2.

As shown in FIG. 4, the digital communication link 241 is connected to the digital signal processor engine 250, which includes a Digital Signal Processor (DSP) or Application Specific Integrated Circuit (ASIC) chip 410, which is connected to Read Only Memory (ROM) 420 and Random Access Memory (RAM) 430. ROM 420 can be comprised of either regular ROM or RAM memory, flash memories, Erasable Programmable Read Only Memory (EPROMs), Electrically Erasable Programmable Read Only Memory (EEPROMs), or other suitable program storage memories. RAM memory 430 can be comprised of static or dynamic RAM, EEPROM, or other suitable data storage memories.

Figure 5:
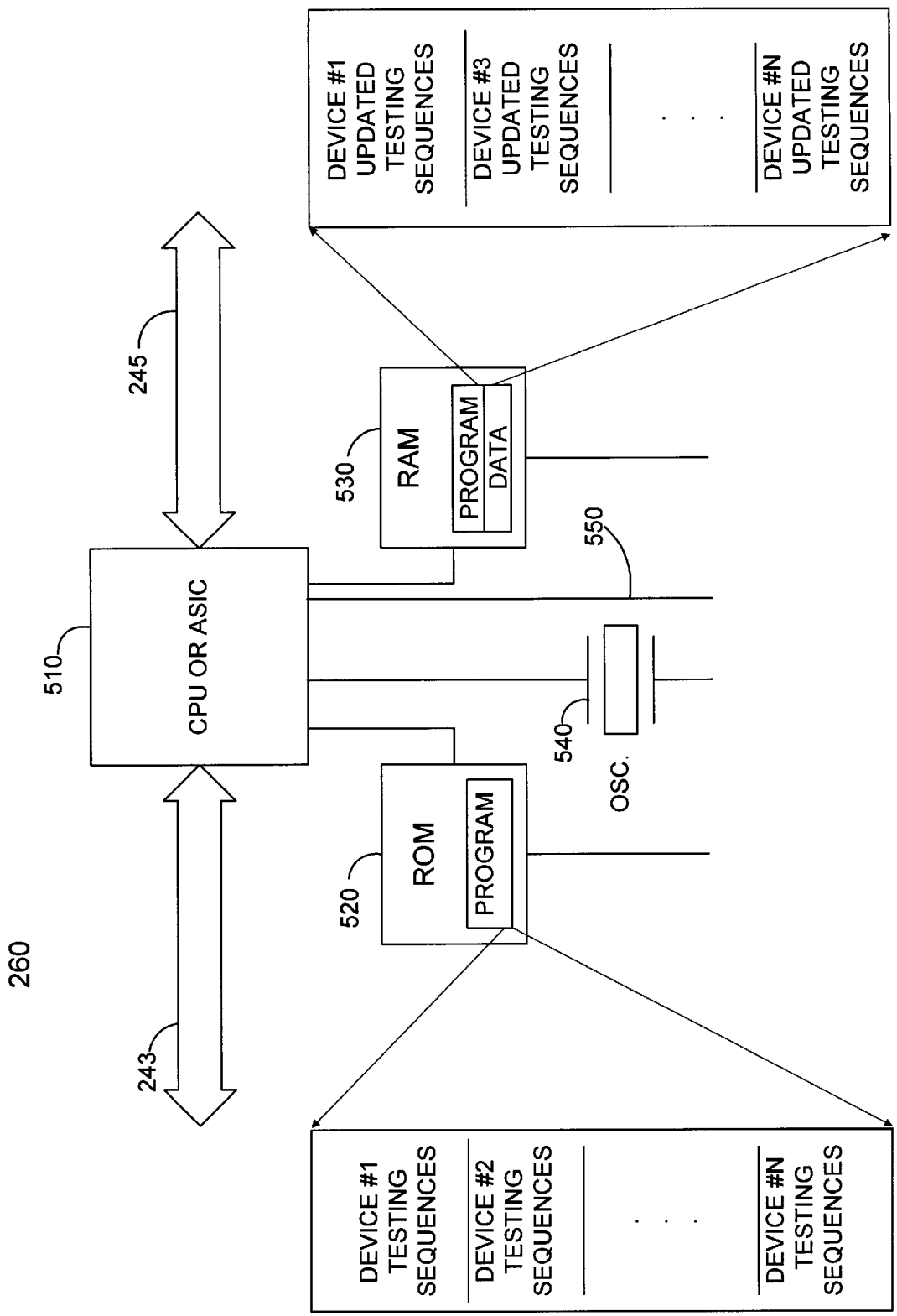
FIG. 5 is a block diagram of the controller of FIG. 2.

In the first embodiment, the testing routines are in the digital signal processor engine 250 program ROM 420, or in the program ROM 520 of the controller 260 (FIG. 5). Testing routines can be downloaded from digital devices, usually a PC connected to the DTE interface 280 (FIG. 2), into the digital signal processor engine 250 program RAM 430, or in the program RAM 530 of the controller 260. It is in this way that an updated testing routine may be downloaded to the modem apparatus to update the testing routines.

Oscillator 440 provides timing signals for the DSP or ASIC 410 across line 441. The DSP or ASIC 410 chip acquires power across line 450.

The incoming signals on digital line 241 are input into the DSP engine 410 for processing. Control signals and digital input/output signals are communicated through across digital communication link 243. Digital communication links 241 and 243 can be comprised of 8, 16, 32, 64, 128 or other bit sized digital parallel communication links. Communication links 241 or 243 can also be comprised of bit serial or other types of chip-to-chip signal communication links. The DSP or ASIC 410 of the digital signal processor engine 250 is connected, via communication link 243, to the controller 260 as illustrated in FIG. 5.

Referring to FIG. 5, the incoming data and signals are input into Central Processor Unit (CPU) or ASIC (510). As with the DSP or ASIC 410 described in FIG. 4, the CPU or ASIC (510) have access to both program ROM 520 and data RAM 530 memories. Oscillator 540 provides timing signals for the CPU or ASIC controller 510. Power is provided to the CPU or ASIC controller over line 550. Communication signals are transmitted from the modem apparatus to the digital equipment through communication link 245 and DTE interface 280 as illustrated in FIG. 2.

Figure 6:
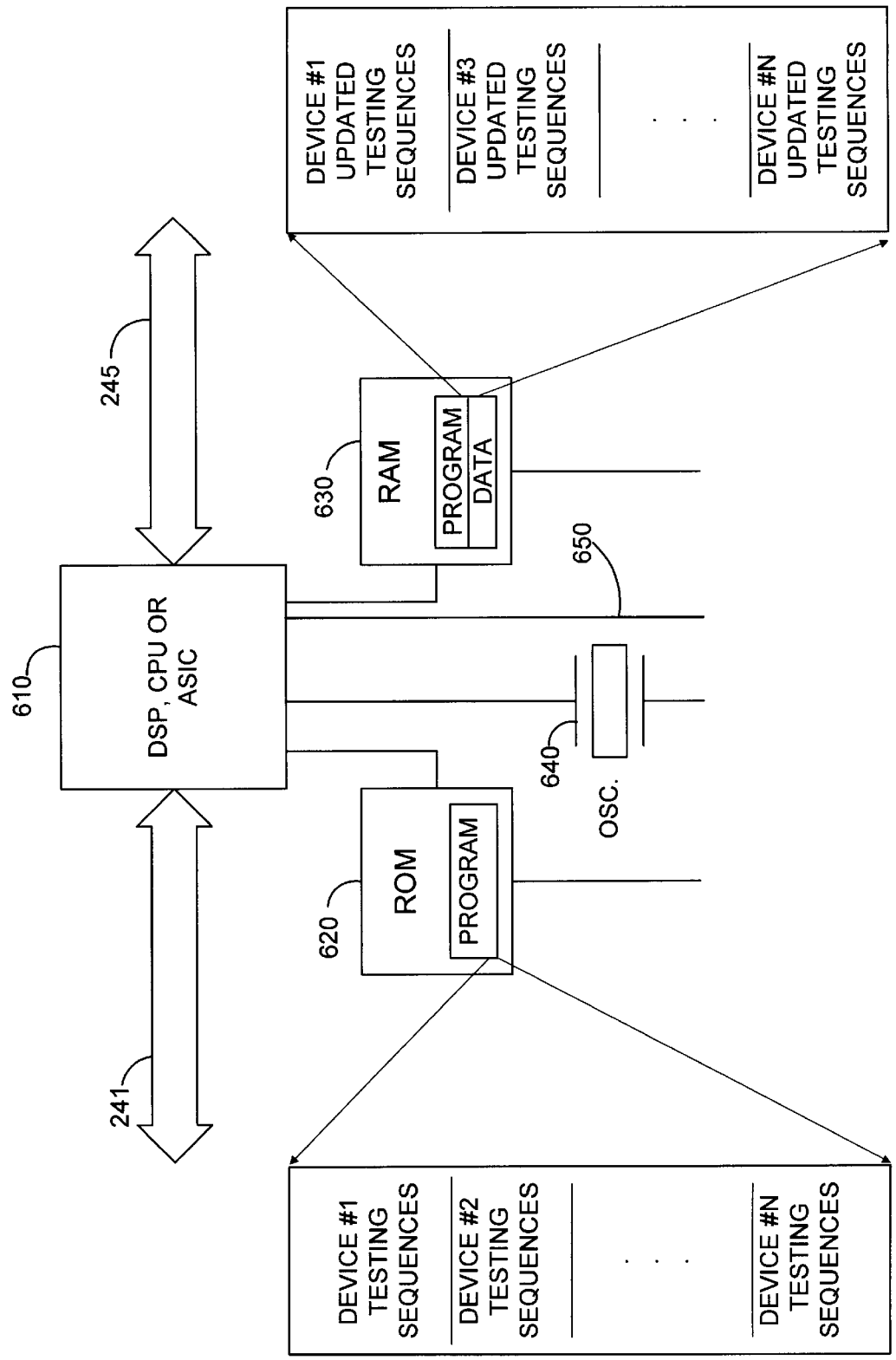
FIG. 6 is a block diagram of the combined digital signal processor engine and controller in a single device of FIG. 2.

An alternative embodiment of combined DSP Engine 250 and Controller 260 is illustrated in FIG. 6, as combined Processor Engine Controller 270. Communication link 241 transmits signals to/from combined Processor Engine Controller 270 and the Analog Interface 240. The digital signals are transmitted/received from the combined DSP controller processor 270 and the DTE Interface 280, across communication link 245. The digital signals are processed within the as combined Processor Engine Controller 270 by RISC, CISC, ASIC or other like high speed processor circuitry. In the CPU, DSP or ASIC 610, both the digital signal analyzing and processing functions are accomplished along with all the previous controller functions from controller 260. Due to the high speed of above mentioned processors, the CPU, DSP or ASIC chip 610 is able to accomplish both the digital signal processing functions as well as the controller functions, all within one chip. Program data is available from the ROM 620. ROM 620 may be comprised of either standard ROM, RAM, EPROM, EEPROM, or flash type memories. Data is available for storage in the data memory illustrated as RAM 630. RAM 630 can represent static or dynamic RAM, EPROM, EEPROM, or flash type memories.

In the alternative embodiment, the testing routines are stored in the combined DSP controller 270 ROM 620. The testing routines can be downloaded from digital devices, usually a PC connected to the DTE interface 280, into the combined DSP controller 270 program RAM 630. It is in this way that an updated testing routine may be downloaded to the modem apparatus to update the testing routines. The combined DSP controller 270 uses signals from oscillator 640 as timing signals. Power is supplied to the CPU or the ASIC chip 610 via lines 650.

Referring to FIG. 7A, illustrated is a flow chart of a POTS device testing process. First, the testing routine is initialized within the DSP, CPU or ASIC chip (step 700). The testing routines can be downloaded from a variety of different sources. In the first embodiment, the testing routines are in the digital signal processor engine 250 program ROM 420, or in the program ROM 520 of the controller 260. The testing routines can also be downloaded from digital devices, usually a PC connected to the DTE interface 280, into the digital signal processor engine 250 program RAM 430, or in the program RAM 530 of the controller 260. It is in this way that an updated testing routine may be downloaded to the modem to change the testing routines.

Once the routines are loaded into the DSP engine 250 or the controller 260, there is a determination as to whether testing of an individual POTS device is to occur (step 705). This determination can be accomplished either in questions displayed on the digital device, usually a PC, connected to the DTE interface 280, or a display on the modem itself. In an alternative embodiment, circuitry in the impedance and isolation circuitry 320 can determine if a device is connected to test jack 230 via test link 123.

If there is a determination that testing of an individual POTS device is to occur, the testing routine determines whether or not the test jack is to be used as the input jack for testing the individual POTS device (step 710). This determination can be accomplished either in questions displayed on the digital device connected to the DTE interface 280, or a display on the modem itself. As mentioned above, in an alternative embodiment circuitry in the modem can determine if a device is connected to test jack 230. If it is determined by the DSP, CPU or ASIC circuitry that the test jack is the input jack, then the input jack is initialized as the test jack (step 715). Otherwise, the input jack is initialized as the operations jack (step 720).

After the input jack has been selected in either step 715 or 720, the individual POTS device is tested on the selected jack in step 725. After the testing has run in step 725, the results are displayed in step 730. The results can be displayed either as a light (not shown) on the modem 110 (FIG. 1), or as an affirmative statement on the device connected DTE interface 280. Then it is determined if the user desires to repeat the testing of individual POTS devices or perform the overall line testing or exit the testing routines (step 735). If there are more individual POTS devices or overall line testing to be performed, the testing routine is repeated at step 705. If it is determined that no more individual POTS devices are to be tested in step 740, then the testing routine exits at step 790.

An alternative method for determining whether to repeat the testing of an individual device or line test is shown in FIG. 7B. The check for continued testing is performed in two (2) parts. First, there is a determination of whether there are more individual POTS devices to be tested (step 745). If there are more individual POTS devices to be tested, the user is instructed to remove the old POTS device and insert a new POTS device on the selected input jack in step 740. The testing routine is repeated starting at step 725. If it is determined that no more individual POTS devices are to be tested in step 740, then there is a determination of whether or not the user desires a line test to be performed. If there is no further testing required, then the testing routine exits at step 790.

Referring again to FIG. 7A, if it is determined (at step 705) that there is no testing of individual POTS devices, the testing routine then proceeds to step 770, which monitors the user premises line for the minimum and maximum performance data rates, while all the POTS devices in a user premises are in either an on-hook or off-hook state. The performance data rate is then displayed on the modem (not shown) or as information displayed on the device connected to the DTE interface 280 at step 775. After the line performance data rate is displayed, it is determined whether or not to repeat the line test, or if testing of an individual POTS device is to occur (step 780). If continued testing is to occur, the routine returns to step 705 which determines if testing of an individual POTS device or performance data rate of the line is to be performed. If it is determined that no additional testing is to occur, the testing routines exits (step 790).

Figure 8:
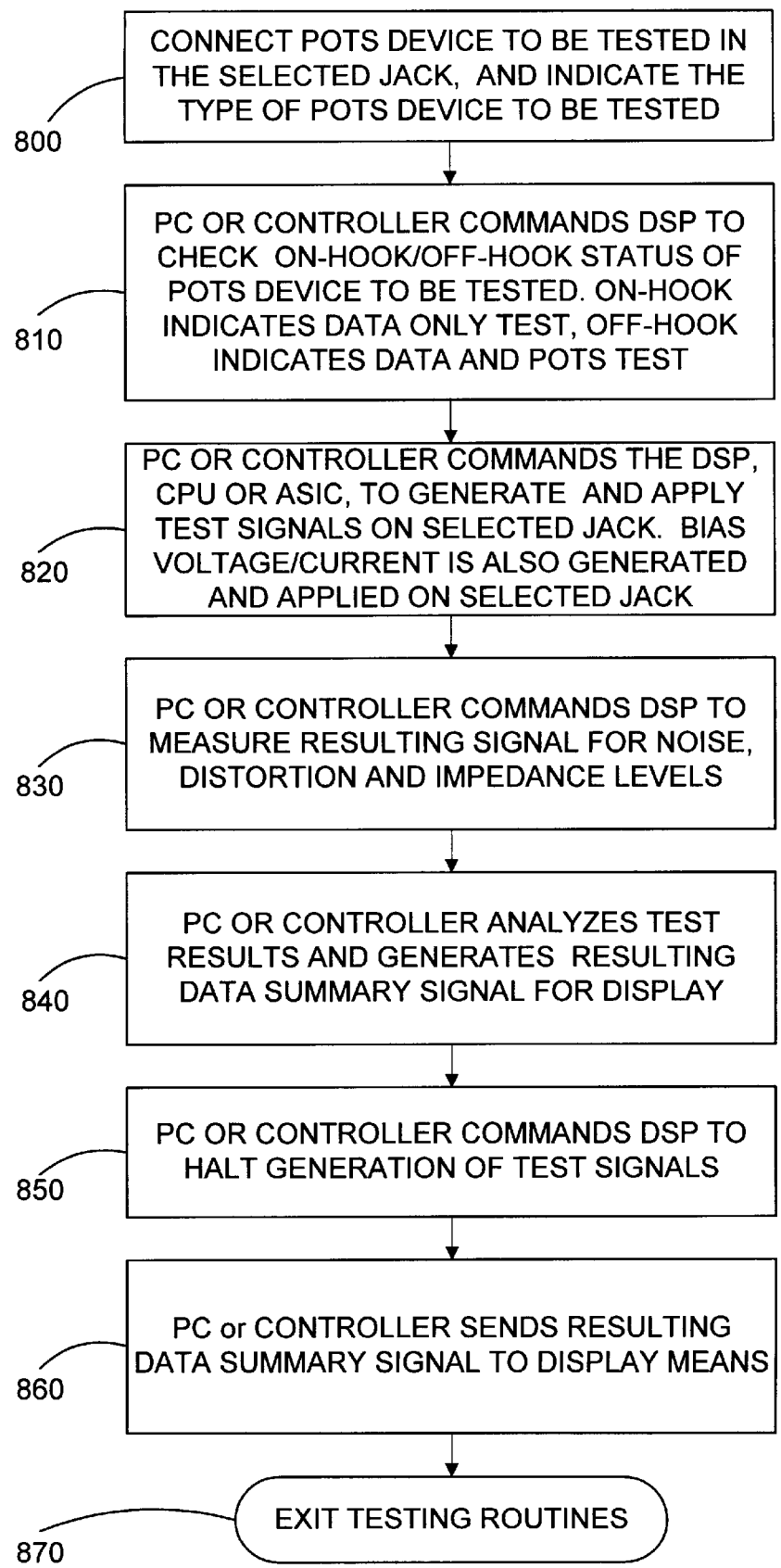
FIG. 8 is a flow chart of the process for testing individual POTS devices on a selected jack, in the process for testing POTS devices of FIG. 7.

Referring now to FIG. 8, a flow chart of a POTS device testing routine 725 is depicted. The first step of the testing routine 725 is to connect the POTS device to be tested to the selected input jack and determine the type of POTS device to tested (step 800). The indication of the type of POTS device to be tested can be solicited in questions displayed on the digital device, usually a PC, connected to the DTE interface 280, or a display on the modem itself, by software routines running on the modem or PC. In an alternative embodiment, circuitry and/or software can determine a POTS device type from signals received from the POTS device.

The controller, in the first embodiment, commands the DSP Engine 250 to check the on-hook or off-hook status of the individual POTS device to be tested on the selected jack (step 810). The on-hook status indicates that only high-speed data capability is to be tested, while off-hook status indicates that both high-speed data capability and POTS device capability (simultaneous with data transmission) are to be tested. Next, the PC, CPU, or controller commands the DSP Engine 250 to generate test signals and bias voltage, and apply those test signals and bias voltage on the selected input jack (step 820). The PC or the controller then commands the DSP Engine 250 to measure the resulting signal for noise, distortion, and impedance levels (step 830). The PC, controller, or DSP can manipulate the measured test data to provide standard metrics as signal-to-noise ratio (SNR), peak to average noise ratio (PA), total harmonic distortion (THD), etc.

Additional analysis by the PC, controller, or DSP can convert these parameters to expected data throughput, and to rate the telephone or other POTS type equipment for display (step 840). Example displays could be "poor," "fair," "good," or "100%," etc. The DSP, CPU, ASIC, PC, or the controller, analyzes the test results and generates the resulting data summary signal for display (step 840). The resulting data summary signal can be displayed either on the modem or on the device connected to the DTE interface 280. The PC or controller then commands the DSP Engine 250 to halt the generation of test signals (step 850). The PC or the controller sends the resulting data summary signal to a display means on the modem itself or on the device connected to the DTE interface 280 DTE interface 280 in step 860. The next step is to exit testing step 870.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A modem apparatus with circuitry for identification of POTS devices that prevent optimum modem operation if connected to a POTS communication link used by a modem apparatus, said modem comprising:

a test jack for connecting a POTS device to be tested;
   a memory;
   a plurality of POTS device testing sequences stored in said memory, said POTS device testing sequences for identification of POTS devices that prevent optimum modem operation; and
   processor circuitry that selects from said memory one of said POTS device testing sequences and that performs the selected POTS device testing sequence on said POTS device to determine if said POTS device prevents optimum modem operation.

2. The apparatus of claim 1, wherein said processor circuitry selects a testing sequence corresponding with a particular type of POTS device and tests the POTS device.

3. The apparatus of claim 1, further comprising circuitry for testing said POTS device, wherein said testing is selected from the noun consisting of: testing an impedance of said POTS device over the modem spectrum, noise emanations, and distortion.

4. The apparatus of claim 1, wherein said processor circuitry selects a communication link testing sequence, wherein the processor circuitry monitors a minimum achievable data rate over a communication link, and wherein said processor circuitry determines adequacy of said minimum achievable data rate as compared to said optimum modem operation.

5. The apparatus of claim 1, further comprising circuitry for generating a bias voltage.

6. The apparatus of claim 1, further comprising circuitry for generating a plurality of test signals.

7. The apparatus of claim 1, wherein said processor circuitry determines a maximum data rate for a selected POTS device; wherein said processor circuitry determines an amount of impact said maximum data rate limit has on said optimum modem operation; and wherein said processor circuitry indicates an acceptability of said amount of POTS device impact on said optimum modem operation.

8. A method for identification of POTS devices that prevent optimum modem operation if connected to a POTS communication link used by a modem apparatus, the method comprising the steps of:

determining if a POTS device to be tested is connected to a test connector;
   selecting from a memory one of a plurality of POTS device testing sequences, said POTS device testing sequences for identification of POTS devices that prevent optimum modem operation; and
   performing said selected POTS device testing sequence on said POTS device using processor circuitry to determine if said POTS device prevents optimum modem operation.

9. The method of claim 8, wherein the step of selecting said testing sequence includes the step of selecting an individual POTS device testing sequence corresponding with a particular type of POTS device connected to said test connector.

10. The method of claim 8, further comprising the step of: connecting the device to be tested to a test jack.

11. The method of claim 8, further comprising the step of: displaying a test result of the selected POTS device testing sequence.

12. The method of claim 8, further comprising the step of: determining if any devices remain to be tested.

13. The method of claim 8, wherein the step of performing the selected POTS device testing sequence includes the step of:

generating a bias voltage.

14. The method of claim 8, wherein the step of performing the selected POTS device testing sequence includes the step of:

generating a plurality of test signals.

15. The method of claim 8, wherein the step of performing the selected POTS device testing sequence includes the step of:

testing said POTS device, wherein said POTS device testing is selected from the group consisting of testing an impedance over the modem spectrum, noise emanations, and distortion.

16. The method of claim 8, wherein the step of selecting said one POTS device testing sequence includes the steps of:

selecting a communication link testing sequence that monitors a minimum achievable data rate over a communication link;

determining an amount of impact of said minimum data rate limit on said optimum modem operation; and indicating an acceptability of said amount of POTS device impact on said optimum modem operation.

17. The method of claim 8, wherein the step of selecting said one POTS device testing sequence includes the step of:

selecting a testing sequence downloaded from a device connected to said modem apparatus.

18. The apparatus of claim 8, wherein the step of performing said selected POTS device testing sequence includes the steps of:

estimating a maximum data rate for a selected POTS device;

determining an amount of impact of said maximum data rate limit on said optimum modem operation; and indicating an acceptability of said amount of POTS device impact on said optimum modem operation.

19. A modem apparatus with circuitry for identification of POTS devices that prevent optimum modem operation if connected to a POTS communication link used by a modem apparatus, said modem comprising:

a means for determining if a POTS device to be tested is connected to a test connector;

a means for storing a plurality of POTS device testing sequences, said POTS device testing sequences for identification of POTS devices that prevent optimum modem operation;

a means for selecting from said memory one of said testing sequences corresponding with a particular type of POTS device; and a means for processing the selected POTS device testing sequence for said POTS device testing to determine if said POTS device prevents optimum modem operation.

20. The apparatus of claim 19, further comprising:

a means for testing, wherein said testing means utilizes a test selected from the group consisting of a test of an impedance of said POTS device over said modem spectrum, noise emanations, and distortion.

21. The apparatus of claim 19, further comprising:

a means for indicating a result of the selected POTS device testing sequence.

22. The apparatus of claim 19, further comprising:

a means for testing said POTS device, wherein said testing is selected from the group consisting of: testing an impedance of said POTS device over the modem spectrum, noise emanations, and distortion.

23. The apparatus of claim 19, further comprising:

a means for monitoring a minimum achievable data rate over a communication link;

a means for determining an amount of impact of said minimum data rate limit on said optimum modem operation; and a means for indicating an acceptability of said amount of POTS device impact on said optimum modem operation.

24. The apparatus of claim 19, further comprising a means for generating a bias voltage.

25. The apparatus of claim 19, further comprising a means for generating a plurality of test signals.

26. The apparatus of claim 19, further comprising:

a means for determining a maximum data rate for a selected POTS device;

a means for determining an amount of impact said maximum data rate limit has on said optimum modem operation; and a means for indicating an acceptability of said amount of POTS device impact on said optimum modem operation.

27. A computer program product for directing a data modem apparatus testing of a POTS device, said program product comprising:

a computer readable recording medium;

a means recorded on the medium for determining if a POTS device to be tested is connected to a test connector;

a plurality of POTS device testing sequence means recorded on the medium for directing the data modem apparatus testing of said POTS device, said POTS device testing sequence means for identification of POTS devices that prevent optimum modem operation; and a means recorded on the medium for selecting a POTS device testing sequence means corresponding with a particular type of POTS device.

28. The computer program product of claim 27, wherein the means for directing includes:

a first routine means, responsive to the means for directing, for testing said POTS device wherein said testing is selected from the group consisting of testing an impedance of said particular type of POTS device over said modem apparatus spectrum, noise emanations, and distortion.

29. The computer program product of claim 27, wherein the means for directing includes:

a second routine means, responsive to the means for directing, for creating a bias voltage.

30. The computer program product of claim 27, wherein the means for directing includes:

a third routine means, responsive to the means for directing, for creating a plurality of test tones for testing said POTS device.

* * * * *

UNITED STATES PATENT AND TRADEMARK OFFICE
CERTIFICATE OF CORRECTION

PATENT NO.   : 6,014,425
DATED        : January 11, 2000
INVENTOR(S)  : Bingel et al.

It is certified that error appears in the above-identified patent and that said Letters Patent is hereby corrected as shown below:

Item [57] Abstract, after the word "premises.", delete the sentence "Testing for line monitoring of the entire premises while the data communication device is in an operating state is also possible.", and substitute therefor -- Testing for line monitoring of the entire premises while the data communication device is operating is also possible. --

Column 1,
Line 21, after the word "particularly,", add the word -- to --.
Line 32, after the word "modem", add the phrase -- in order --
Line 36, after the word "loopback", delete the word "test", and substitute therefor -- mode -- .
Line 37, after the third occurrence of the word "the", delete the word "signals", and substitute therefor -- signal --.
Line 43, after the word "analyze", add the phrase -- the quantity of --.
Line 43, after the word "loopback", delete the phrase "signals for their quality", and substitute therefor -- signal --.
Line 43, after the word "and", add the word -- determine --.
Line 53, after the word "test", add the phrase -- the impedance of --.
Line 54, after the word "device", delete the word "impedance".
Line 55, after the word "utilized),", add the phrase -- and tests for --.
Line 55, after the word "emanations,", delete the symbol ",".
Line 55, after the word "and", delete the word "distortions", and substitute threfor -- distortion caused by the POTS device --.
Lines 63-64, after the word "transmitted", delete the phrase "to measure the resultant signal", and substitute therefor -- and the resultant signal measured --.

Column 2,
Line 1, after the second occurrence of the word "the", delete the word "power", and substitute therefor -- level --.
Line 5, after the word "as", delete the phrase "weather changes", and substitute therefor -- changes in weather --.
Line 6, after the word "noise,", delete the word "dirty", and substitute therefor -- contaminated --.
Line 6, after the word "of", delete the word "poorly", and substitute therefor -- improperly --.
Line 8, delete the phrase "Distortions come", and substitute therefor -- Distortion can manifest --.
Line 8, after the word "numerous", delete the word "forms", and substitute therefor -- ways and is --.
Line 11, after the word "are", delete the word "not", and substitute therefor -- neither --.

UNITED STATES PATENT AND TRADEMARK OFFICE
CERTIFICATE OF CORRECTION

PATENT NO.  : 6,014,425
DATED       : January 11, 2000
INVENTOR(S) : Bingel et al.

It is certified that error appears in the above-identified patent and that said Letters Patent is hereby corrected as shown below:

Column 2,
Line 11, after the word "amplitude," delete the word "or", and add the phrase -- nor are they --.
Line 11, after the word "nor", add the phrase -- are they --.
Line 12, after the word "time", delete the word "invariant", and substitute therefor -- dependent --.
Line 24, after the word "circuit.", delete the word "Mismatch", and substitute therefor -- Impedance mismatch --.
Line 34, after the word "device", delete the symbol ",".
Line 51, after the word "telephones", add the symbol -- , --.
Line 51, after the word "devices", add the symbol -- , --.

Column 3,
Line 2, after the word "is", delete the phrase "in an".
Line 3, after the word "operating", delete the word "state".
Line 5, after the word "device", delete the symbol ",".
Line 6, after the word "system", delete the symbol ",".
Line 10, after the word "rate", add the phrase -- of the modem --.
Line 11, after the word "device", delete the phrase "needs to checked", and substitute therefor -- should be examined to discover the cause of the reduced data rate --. .
Lines 50-51, after the word "views", delete the symbol ".", and substitute therefor -- , --, such that the paragraph beginning with the word "FIG.1" is joined with the preceding paragraph.
Line 51, after the word "illustrates", delete the word "the", and substitute therefor -- a --.
Line 52, after the word "POTS", delete the word "networks", and substitute therefor -- network --.
Line 53, after the word "embodiment", delete the symbol ",", and substitute therefor -- . --.
Line 53, after the word "embodiment", delete the word "that", and substitute therefor -- Modem 110 --.
Line 53, after the word "and", delete the word "methods", and substitute therefor -- method of the invention --.
Line 54, after the word "devices", add the word -- connected --.
Line 55, after the word "user", delete the word "premisess", and substitute therefor -- premises loccations --.
Line 58, after the first occurrence of the word "to", delete the word "the", and substitute therefor -- a --.
Line 61, after the numeral "105", add the symbol -- , --.

UNITED STATES PATENT AND TRADEMARK OFFICE
CERTIFICATE OF CORRECTION

PATENT NO. : 6,014,425
DATED : January 11, 2000
INVENTOR(S) : Bingel et al.

It is certified that error appears in the above-identified patent and that said Letters Patent is hereby corrected as shown below:

<u>Column 4,</u>
Line 5, after the word "sent", delete the word "on".
Line 6, after the word "to", delete the word "the".
Line 8, after the numeral "191", delete the symbol ",".
Line 10, after the word "are", delete the word "further".
Line 11, after the numeral "195", delete the word "for", and substitute therefor --, which provides --.
Line 12, after the word "network", add the phrase -- access service --.
Line 12, after the phrase "196,", delete the symbol ", ", and substitute therefor the symbol -- . --.
Line 12, after the phrase "196,", delete the word "for", and substitute therefor -- Network equipment 196 provides --.
Line 12, after the word "connection", delete the word "with", and substitute therefor -- to --.
Line 14, delete the phrase "Since the", and substitute therefor -- The --.
Line 14, after the second occurrence of the word "the", add the phrase -- system in which the --.
Line 14, after the word "present", delete the word "invention's", and substitute therefor -- invention is designed to operate. --.
Line 15, delete the phrase "applied system.", and substitute therefor -- Accordingly, --.
Line 18, after the word "networks", delete the word "back", and substitute therefor --, and back to --.
Line 18, after, the word "be", delete the word "detailed", and substitute therefor -- provided --.
Line 21, after the word "condition", delete the word "that", and substitute therefor --. This off-hook condition --.
Line 23, after the numeral "190", add the symbol -- , --.
Line 23, after the numeral "101", add the symbol -- , --.
Lines 28-29, after the word "signals", delete the phrase ", and the", and substitute therefor --. The --.
Line 32, after the word "wire", delete the word "system", and substitute therefor -- center --.
Line 40, after the second occurrence of the word "the", add the word -- received --.
Line 41, after the word "signal", delete the phrase "to be received".
Lines 41-42, after the word "premises", delete the phrase "That is", and substitute therefor -- This illustrates --.
Line 47, after the word "device", delete the symbol ",".
Line 51, after the word "signals", delete the phrase "go into", and substitute therefor -- enter --.

UNITED STATES PATENT AND TRADEMARK OFFICE
CERTIFICATE OF CORRECTION

PATENT NO.   : 6,014,425
DATED        : January 11, 2000
INVENTOR(S)  : Bingel et al.

It is certified that error appears in the above-identified patent and that said Letters Patent is hereby corrected as shown below:

Column 4,
Line 55, after the first occurrence of the word "POTS", add the word -- signals --.
Line 56, after the word "POTS", add the word -- signals --.
Line 59, after the numeral "195", delete the phrase "for processing", and substitute therefor --. Central office host 195 processes --.
Line 60, delete the phrase "transmission of", and substitute therefor -- transmits --.
Line 60, after the word "network", add the phrase -- access service --.
Line 60, after the numeral "196", add the symbol -- , --.
Line 61, delete the phrase "for further transmission of", and substitute therefor -- which transmits --.
Line 62, after the phrase "197.", add a paragraph break.
Line 63, after the numeral "190", delete the symbol ",".
Line 65, after the numeral "195", delete the symbol ",".

Column 5,
Line 3, after the numeral "105", delete the symbol ",".
Line 6, after the word "demodulated", delete the symbol ",".
Line 6, after the numeral "110", delete the symbol ",".
Line 6, after the numeral "110", delete the word "back".
Line 9, after the word "transmitted", delete the word "within", and substitute therefor -- over --.
Line 21, after the word "distortion", delete the word "attached", and substitute therefor -- imparted --.
Line 30, after the word "the", delete the word "optimum", and substitute therefor -- optimal --.
Line 32, after the word "ways", add the phrase --, such --.
Line 33, after the word "POOR", delete the word "light".
Line 33, after the word "or", add the phrase -- can be --.
Line 35, after the word "An", delete the word "alternate", and substitute therefor -- alternative --.
Line 36, after the word "entire", delete the word "user's", and substitute therefor -- user --.
Line 36, after the word "is", delete the phrase "in an".
Line 36-37, after the word "operating", delete the word "state".
Line 37, after the first occurrence of the word "The", delete the word "alternate", and substitute therefor -- alternative --.
Line 39, after the word "device", delete the symbol ",".
Line 40, after the word "system", delete the symbol ",".
Line 40, after the word "is", delete the phrase "in an".
Line 40, after the word "off-hook", delete the word "state".

UNITED STATES PATENT AND TRADEMARK OFFICE
CERTIFICATE OF CORRECTION

PATENT NO. : 6,014,425
DATED : January 11, 2000
INVENTOR(S) : Bingel et al.

It is certified that error appears in the above-identified patent and that said Letters Patent is hereby corrected as shown below:

Column 5,
Line 45, after the word "device", delete the phrase "needs to", and substitute therefor -- should be --.
Line 46, after the word "described", delete the word "in", and substitute therefor -- with --.
Line 49, after the word "invention.", delete the word "The", and substitute therefor -- In a --.
Lines 49-50, after the word "configuration", delete the word "of", and substitute therefor -- , --.
Line 59, after the word "impedance", add the word -- matching --.
Lines 61-62, after the numeral "231", delete the word "provide", and substitute therefor -- conduct --.
Line 63, after the numeral "241", delete the symbol ",".
Line 66, after the word "In", delete the word "the", and substitute therefor -- a --.

Column 6,
Line 6, after the numeral "280", delete the phrase ", which", and substitute therefor --. DTE interface 280 --.
Line 7, after the word "facsimile", add the word -- machine --.
Line 9, delete the phrase "Referring to FIG. 3, which is", and substitute therefor -- FIG.3 shows --.
Line 10, after the phrase "240,", delete the phrase "the analog interface 240 has", and substitute therefor -- which includes --.
Line 12, delete the word "communications", and substitutes therefor -- communication --.
Line 13, after the word "connected", add the phrase -- on one side --.
Line 13, after the word "is", add the word -- also --.
Line 17, delete the word "circuit", and substitute therefor -- device --.
Line 17, after the word "is", delete the phrase "then further".
Line 20, after the word "device", delete the word "line", and subtitute therefor -- communication link --.
Line 21, after the numeral "231", delete the phrase "being directly", and substitute therefor -- is --.
Line 21, after the word "connected", add the word -- directly --.
Line 25, after the word "test", add the word -- device --.
Line 28, after the word "wire", delete the word "hyped", and substitute therefor --hybrid --.
Line 29, after the word "test", add the word -- device --.
Line 32, after the numeral "330", add the symbol -- , --.
Line 33, after the word "them", add the phrase -- over communication line 345 --.

UNITED STATES PATENT AND TRADEMARK OFFICE
CERTIFICATE OF CORRECTION

PATENT NO. : 6,014,425
DATED : January 11, 2000
INVENTOR(S) : Bingel et al.

Page 6 of 9

It is certified that error appears in the above-identified patent and that said Letters Patent is hereby corrected as shown below:

Column 6,
Line 34, after the numeral "340", delete the phrase "over communication link 345".
Line 38, after the word "communication", add the word -- link --.
Line 39, after the word "are", delete the word "both".
Line 40, after the word "the", delete the word "bi-directional".
Line 40, after the numeral "241", add the phrase --, which is bi-directional --.
Line 44, after the numeral "410", delete the phrase ", which", and substitute therefor
--. The DSP or ASIC --.
Line 54, delete the phrase "digital signal processor engine 250".
Lines 56-57, after the word "devices,", delete the word "usually", and substitute therefor
-- such as --.
Line 59, after the phrase "260.", delete the phrase "It is", and substitute therefor -- In --.
Line 60, after the word "this", delete the phrase "way that", and substitute therefor
-- manner --.
Line 66, after the word "digital", delete the word "line", and substitute therefor
-- communication link --.

Column 7,
Line 1, after the word "communicated", delete the word "through".
Line 8, after the word "via", add the word -- digital --.
Line 10, after the word "incoming", delete the phrase "data and".
Line 11, after the word "into", delete the phrase "Central Processor Unit (CPU) or ASIC (510)", and substitute therefor -- CPU or ASIC 510 --.
Line 13, after the word "ASIC", delete the phrase "(510) have", and substitute therefor
-- 510 has --.
Line 15, after the word "ASIC", delete the word "controller".
Line 16, after the word "ASIC", delete the word "controller".
Line 20, after the word "embodiment", delete the word "of", and substitute therefor
-- illustrating a --.
Line 21, after the numeral "6", delete the symbol ",".
Line 24, after the first occurrence of the word "the", delete the phrase "Analog Interface", and substitute therefor -- analog interface --.
Lines 25-26, after the word "combined", delete the phrase "DSP controller processor", and substitute there for -- Processor Engine Controller --.
Line 28, after the word "the", delete the word "as".
Line 30, after the word "signal", delete the word "analyzing", and substitute therefor
-- analysis --.
Line 32, delete the word "previous", and substitute therefor -- previously described --.
Line 32, after the word "functions", delete the word "from", and substitute therefor
-- performed by --.
Line 33, after the word "high", add the word -- operating --.
Line 33, after the word "the", add the word -- single --.
Lines 35-36, after the word "functions", delete the phrase ", all within one chip".

UNITED STATES PATENT AND TRADEMARK OFFICE
CERTIFICATE OF CORRECTION

PATENT NO. : 6,014,425
DATED : January 11, 2000
INVENTOR(S) : Bingel et al.

It is certified that error appears in the above-identified patent and that said Letters Patent is hereby corrected as shown below:

Column 7,
Line 43, after the word "in", delete the phrase "the combined DSP controller 270".
Line 45, delete the word "usually", and substitute therefor -- such as --.
Lines 45-46, after the second occurrence of the word "the" delete the phrase "combined DSP controller 270 program", and substitute therefor -- Program --.
Line 46, after the phrase "630.", delete the phrase "It is in", and substitute therefor -- In --.
Line 47, after the word "this", delete the phrase "way that", and substitute therefor -- manner --.
Line 56, after the first occurrence of the word "In", delete the word "the", and substitute therefor -- a --.
Line 60, after the word "devices,", delete the word "usually", and substitute therefor -- such as --.
Lines 62-63, after the word "or", delete the word "in", and substitute therefor -- into --.
Line 62, after the phrase "260.", delete the phrase "It is in", and substitute therefor -- In --.
Line 63, after the word "this", delete the phrase "way that", and substitute therefor -- manner --.

Column 8,
Line 3, after the word "PC", delete the symbol ","
Line 6, after the word "determine", delete the word "if", and substitute therefor -- whether --.
Line 8, after the word "If", delete the phrase "there is a determination", and substitute therefor -- it is determined --.
Line 10, after the word "whether", delete the phrase "or not".
Line 12, after the word "either", delete the word "in", and substitute therefor "by".
Line 15, after the word "embodiment", add the symbol -- , --.
Lines 15-16, after the word "determine", delete the word "if", and substitute therefor -- whether --.
Line 18, after the second occurrence of the word "the", delete the word "input", and substitute therefor -- test --.
Lines 18-19, after the third occurrence of the word "the", delete the word "test", and substitute therefor -- input --.
Line 19, after the word "the", delete the word "input", and substitute therefor -- line --.
Line 20, after the word "the", delete the word "operations", and substitute therefor -- input --.

UNITED STATES PATENT AND TRADEMARK OFFICE
CERTIFICATE OF CORRECTION

PATENT NO.    : 6,014,425
DATED         : January 11, 2000
INVENTOR(S)   : Bingel et al.

It is certified that error appears in the above-identified patent and that said Letters Patent is hereby corrected as shown below:

<u>Column 8,</u>
Line 26, after the word "connected", add the word -- to --.
Line 27, after the word "Then", add the symbol -- , --.
Line 27, after the word "determined", delete the word "if", and substitute therefor -- whether --.
Line 28, after the word "devices", delete the word "or", and substitute therefor -- , --.
Line 29, after the word "testing", add the symbol -- , --.
Line 30, after the word "are", delete the word "more", and substitute therefor -- additional --.
Line 32, after the word "no", delete the word "more", and substitute therefor -- additional --.
Line 33, after the word "tested", delete the phrase "in step 740".
Line 36, after the word "device", delete the phrase "or line test", and substitute therefor --, or perform line testing --.
Line 39, after the word "are", delete the word "more", and substitute therefor -- additional --.
Line 40, after the word "are", delete the word "more", and substitute therefor -- additional --.
Line 44, after the word "no", delete the word "more", and substitute therefor -- additional --.
Line 45, after the word "step", delete the numeral "740", and substitute therefor -- 745 --.
Line 45, after the word "then", add the phrase --, in step 750, --.
Line 54, after the word "state.", delete the word "The", and substitute therefor -- At step 775, the --.
Line 57, after the numeral "280", delete the phrase "at step 775".
Line 61, after the word "determines", delete the word "if", and substitute therefor -- whether --.
Line 62, after the word "rate", add the word -- measurement --.

<u>Column 9,</u>
Line 2, after the word "jack", delete the phrase "and determine", and substitute therefor -- so that --.
Line 3, after the word "tested", add the phrase -- can be determined --.
Line 4, after the word "solicited", delete the word "in", and substitute therefor -- by --.
Line 4, after the word "questions", add the phrase -- generated by software routines running on the modem or a PC, and --.
Line 5, after the word "device,", delete the word "usually", and substitute therefor -- such as --.

UNITED STATES PATENT AND TRADEMARK OFFICE
CERTIFICATE OF CORRECTION

PATENT NO. : 6,014,425
DATED : January 11, 2000
INVENTOR(S) : Bingel et al.

It is certified that error appears in the above-identified patent and that said Letters Patent is hereby corrected as shown below:

Column 9,
Line 5, after the word "PC", delete the symbol ",".
Lines 6-7, after the word "itself", delete the phrase ", by software routines running on the modem or PC".
Line 12, after the word "to", delete the phrase "check the", and substitute therefor -- determine --.
Line 29, after the word "these", delete the word "parameters", and substitute therefor -- metrics --.
Line 29, after the first occurrence of the word "to", add the word -- determine --.
Line 33, after the word "controller", delete the symbol ",".

Signed and Sealed this

Thirteenth Day of November, 2001

Attest:

NICHOLAS P. GODICI
*Attesting Officer*     *Acting Director of the United States Patent and Trademark Office*